United States Patent [19]

Sherman et al.

[11] Patent Number: 4,979,719
[45] Date of Patent: Dec. 25, 1990

[54] BASE CLAMP

[75] Inventors: Jeffrey S. Sherman, St. Louis County; Ronald D. Williams, St. Charles County, both of Mo.

[73] Assignee: Emerson Electric Co., St. Louis, Mo.

[21] Appl. No.: 448,380

[22] Filed: Dec. 11, 1989

[51] Int. Cl.⁵ ............................................. F16M 11/00
[52] U.S. Cl. ..................................... 248/675; 248/316.6
[58] Field of Search ............ 248/675, 674, 230, 231.6, 248/678, 316.6; 16/253

[56] References Cited

U.S. PATENT DOCUMENTS

| | | | |
|---|---|---|---|
| 1,761,752 | 6/1930 | Scott | 248/675 |
| 2,570,850 | 10/1951 | Riemenschneider et al. | 248/230 |
| 2,705,121 | 3/1955 | Kaminky et al. | 248/230 |
| 3,289,982 | 12/1966 | Hart, Jr. | 248/230 X |
| 3,310,270 | 3/1967 | Ciancio | 248/230 |

Primary Examiner—Alvin C. Chin-Shue
Attorney, Agent, or Firm—Polster, Polster and Lucchesi

[57] ABSTRACT

A motor base clamp for clamping motors or the like to a supporting base is disclosed. The motor base clamp includes a pair of mirror image elongated clamping elements attached at one end to the supporting base and configured to surround the motor or the like. The free ends of the clamping elements are associated with a fastener that secures and tightens the clamping elements together in the vicinity of the free ends of the elements so as to clamp a motor or the like to the supporting base. At least one of the fastener or the free ends of the clamping elements are configured to equally distribute the load of the fastener to the free ends of the clamping elements when secured and tightened together.

4 Claims, 2 Drawing Sheets

BASE CLAMP

Background of the Invention

The present invention relates to a base clamp for clamping dynamoelectric machines, motors or the like to a supporting base.

The current technique for clamping a motor to a supporting base involves the use of a pair of cooperating base clamps which surround the motor and including fastener engaging surfaces at the free ends thereof. Aligned holes are provided in the fastener engaging surfaces, at the free ends of the cooperating base clamps, through which a clamping bolt extends. The clamping bolt is threaded and receives a nut along the threaded free end thereof. The clamping bolt and nut secure and tighten the cooperating base clamps together, along the fastener engaging surfaces at the free ends thereof, in order to clamp and secure the motor or the like to a supporting base.

In applying clamping force through the clamping bolt and nut to the fastener engaging surfaces at the free ends of the cooperating pair of base clamps, the current prior art base clamp construction imparts bending stress of the clamping bolt. Specifically, the fastener clamping forces acting on the fastener engaging surfaces at the free ends of the clamping elements, imparts a bending moment to the clamping bolt. Not only does this create undesirable stress in the clamping bolt that could lead to distortion and failure, the current prior art base clamp construction is also unsightly in appearance, and does not readily lend itself to assembly and tightening of the components.

The present invention discloses a new and improved base clamp construction which, in addition to overcoming the aforementioned deficiencies, provides new and improved results in both function and appearance, as will be discussed in detail below.

SUMMARY OF THE INVENTION

Among the several objects and advantages of the present invention include:

The provision of a new and improved base clamp for clamping motors or the like to a supporting base;

The provision of the aforementioned new and improved base clamp which eliminates any bending moment in the fastener or clamping bolt associated with the base clamp;

The provision of the new and improved aforementioned base clamp which distributes the loading forces applied by the associated clamping bolt so as to eliminate the bending moment in the clamping bolt;

The provision of the new and improved aforementioned base clamp which captures the nut and/or bolt head of the clamping bolt so as to prevent rotation during tightening and assembly of components, thereby eliminating the need to hold the clamping bolt or nut during assembly; and The provision of the new and improved aforementioned base clamp which provides the improved function features, while also providing a better overall appearance, and without resulting in any added cost over the prior art current base clamp construction.

Briefly stated, the present invention relates to a motor base clamp for clamping motors or the like to a supporting base. The base clamp includes a pair of mirror image elongated clamping elements each operably attached at one end to a supporting base and having an inwardly curving configuration for surrounding a motor or the like for positioning free ends of the elements in proximity to one another. The fastener means are operably associated with the free ends of the clamping elements for securing and tightening the elements together in the vicinity of the free ends thereof so as to clamp a motor or the like to the supporting base. At least one of the fastener means or the free ends of the clamping elements being configured to equally distribute the load of the fastener means to the free ends of the clamping elements when secured and tightened together.

Preferably, the free ends of the clamping elements are configured, arranged and dimensioned for equally distributing the load of the fastener means when engaged thereby. The fastener means extends through aligned openings in the free ends of the elements and includes fastener clamping surfaces for engaging the free ends of the elements on opposite marginal areas adjacent the aligned openings on each free end of the clamping elements.

The free ends of the elements are configured, shaped and dimensioned to engage the fastener clamping surfaces during and followed tightening of the free ends together. More specifically, the free ends of the elements are provided with angularly offset surfaces on opposite sides of each of the aligned openings for engaging the fastener clamping surfaces, also on opposite sides of the aligned openings.

The fastener means preferably comprises a threaded nut and headed bolt which are provided with the fastener clamping surfaces. The headed bolt and complementary nut provide the fastener clamping surfaces which engage the angularly offset surfaces provided on the free ends of the elements. The fastener clamping surfaces engage the angularly offset surfaces on opposite marginal areas adjacent the aligned openings on each free end of the elements.

By the aforesaid construction, equal load distribution across the fastener clamping surfaces is provided, without imparting a bending moment to the clamping bolt as in prior art constructions. Function, assembly and appearance are also improved, as discussed above, without increased cost.

These and other objects of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENT

The following detailed description illustrates the invention by way of example and not by way of limitation. This description will clearly enable one skilled in the art to make and use the invention, and describe several embodiments, adaptions, variations, alternatives and uses of the invention, including what we presently believe is the best mode of carrying out the invention.

Figure 5:
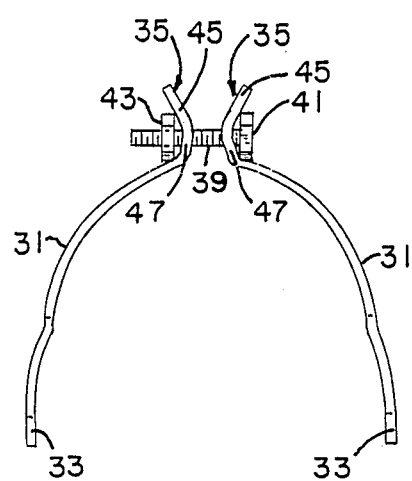
FIG. 5 is a side elevational view similar to FIG. 4, illustrating the cooperating elongated clamping elements after the clamping bolt and nut are threaded into tightening engagement.
Figure 6:
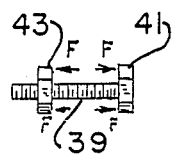
FIG. 6 is a diagrammatic view of the clamping bolt and nut illustrating the equal load distribution of the clamping bolt and nut relative to the free ends of the elongated clamping elements.
Figure 7:
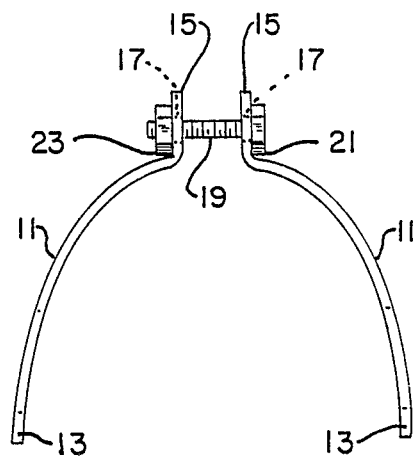
FIG. 7 is a side elevational view of prior art mirror image elongated clamping elements just prior to tightening thereof.
Figure 8:
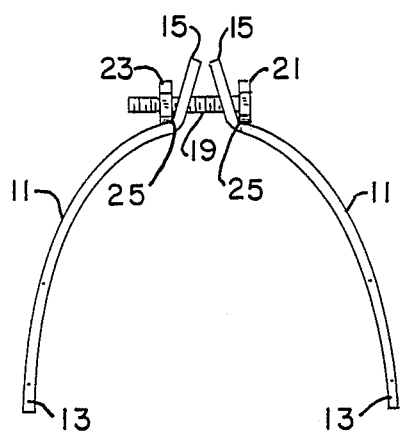
FIG. 8 is a view similar to FIG. 7 and showing the prior art clamping elements being contacted by the clamping bolt and nut along the free ends of the clamping elements after starting to tighten.
Figure 9:
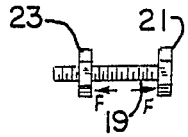
FIG. 9 is a diagrammatic view of the clamping bolt and nut used in the FIG. 7 and 8 prior art constructions and illustrating the unequal load distribution of the clamping bolt and nut relative to the free ends of the clamping elements.

The construction and operation of the motor base clamp of the present invention, including its intended environment, is best seen in FIGS. 1-6 of the drawings, while FIGS. 7-9 show the construction and operation of the current prior art motor base clamps.

Figure 1:
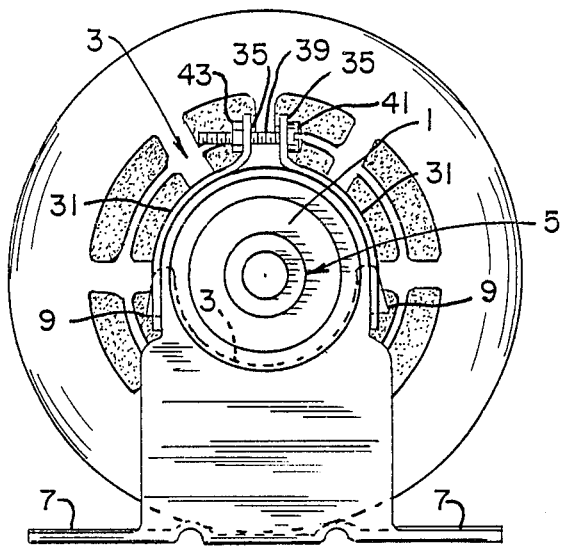
FIG. 1 is a side elevational view of a motor which is clamped to a supporting base by a base clamp constructed in accordance with the teachings of the present invention.
Figure 2:
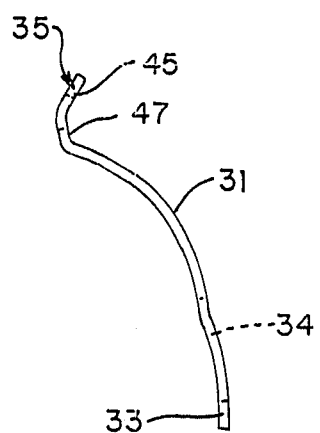
FIG. 2 is an enlarged side elevational view of one of the mirror image elongated clamping elements forming the base clamp of the present invention.
Figure 3:
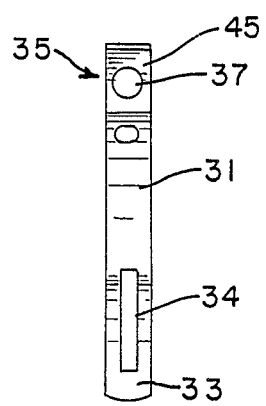
FIG. 3 is an end elevational view of the elongated clamping element shown in FIG. 2.

Referring first to the environment in which the motor base clamp of the present invention is preferably used, it will be seen in FIG. 1 of the drawings that the motor 1 is cradled and supported within the yoke 3 of the supporting base 5, the supporting base 5 having outwardly extending feet 7, 7 for attachment to a floor or other supporting structure. The supporting base 5 is further provided with a pair of spaced outwardly extending hook portions 9, 9 in the vicinity of the cradle 3.

For clamping and securing the motor 1 to the supporting base 5, the prior art construction, as shown in FIGS. 7-9 of the drawings, includes a pair of mirror image, elongated and generally curvilinear clamping elements 11, 11. At the lower ends 13, 13 of the clamping elements 11,11, a slot (not shown) is provided for complementary interfitting engagement with the hook portions 9, 9 of the supporting base 5. Thus, each of the elongated and generally curvilinear clamping elements 11, 11 are operably attached at one end to the supporting base 5 by the complementary interconnection between the slots (not shown) adjacent the lower ends 13, 13 thereof and the hook portions 9, 9 of the supporting base 5.

As shown in FIGS. 7-8 of the drawings, the mirror image, elongated and generally curvilinear clamping elements 11, 11 have an inwardly curving configuration for surrounding the motor 1 or the like and for also positioning the free ends 15, 15 into proximity with one another. The free ends 15, 15 are generally vertically directed with aligned holes 17, 17 therein for receiving the clamping bolt 19 therethrough. The clamping bolt 19 has an enlarged bolt head 21 at one end and a threaded free end for receiving the complementary threaded nut 23.

FIG. 7 of the drawing shows initial assembly of the above components in the typical prior art construction. The bolt head 21 of the clamping bolt and the clamping nut 23 provide fastener clamping surfaces which engage fastener engaging surfaces along outer faces of the vertically directed free ends 15, 15. After starting to tighten the clamping bolt 19 and the complementary nut 23, the clamping elements 11, 11 are moved from the initial shape shown in FIG. 7 of the drawings to that illustrated in FIG. 8 of the drawings where the clamping elements 11, 11 are moved into closer surrounding and clamping engagement relative to the outer periphery of motor 1, for example. Note; however, that in the prior art constructions, the initial generally vertically directed free ends 15, 15 are deformed inwardly toward one another by the bolt head 21 and the nut 23 by being brought into edge contact engagement at 25, 25 with the free ends 15, 15 of the clamping elements 11, 11, as the clamping elements 11, 11 are moved in a curvilinear path for clamping engagement with the motor 1 or the like.

Because of this edge contact engagement between the clamping bolt at 21 and the nut 23 with the inwardly deflected free ends 15, 15 of the clamping elements 11, 11, severe bending stress will be imparted to the clamping bolt 19. This is best illustrated in FIG. 9 of the drawing where the opposite arrows labeled F, F, illustrating force applied to the lower ends of the bolt head 21 and the nut 23, demonstrates that a bending moment will be applied to the clamping bolt 19, which could result in distortion or failure of the clamping bolt 19. This could further result in loosening of the clamping elements 11, 11, resulting in vibration of the motor 1, and/or possible total separation of the clamping elements 11, 11 when the clamping bolt 19 fails. In addition to the potential for distortion or failure of the clamping bolt 19, it is necessary to suitably grip and engage the clamping bolt head 21 and the nut 23 during assembly and tightening of the components. Even when fully tightened into engagement with the motor 1, the inwardly deflected free ends 15, 15 of the clamping elements 11, 11 provide a rather unsightly appearance, as will appreciated.

In accordance with the teachings of the present invention, the prior art base clamp has been re-designed in order to overcome the aforenoted deficiencies.

Figure 4:
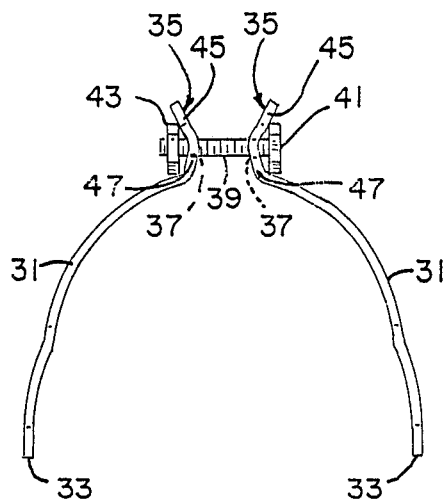
FIG. 4 is a side elevational view of the base clamp including a cooperating pair of mirror image elongated clamping elements and a clamping bolt and nut associated therewith, just prior to tightening thereof.

Specifically, and with reference to FIGS. 1-6 of the drawings, it will be seen that the base clamp of the present invention also includes a pair of mirror image elongated and generally curvilinear clamping elements 31, 31 each also having a lower end 33 with a slot 34 therein (see FIG. 3) for receiving the hook portions 9, 9 of the supporting base 5. In this way, each of the clamping elements 31 are attached at the lower end 33 to the supporting base 5 and then extend in an inwardly curving configuration relative to one another for surrounding the motor 1. The free ends 35, 35 of each of the clamping elements 31, 31 are positioned in proximity to one another in their initial shape prior to tightening thereof, as best seen in FIG. 4 of the drawings. Each of the free ends 35, 35 of the clamping elements 31, 31 are provided With aligned holes 37, 37 for receiving the clamping bolt 39 that includes an enlarged head 41 at one end thereof, with the threaded free end of the clamping bolt 39 receiving a complementary nut 43.

As can be seen, the construction of the clamping elements 31, 31, including the clamping bolt 39 with enlarged head 41 and complementary nut 43, is generally similar to current prior art constructions; however, there are very important differences which enable the base clamp 3 of the present invention to overcome the aforenoted deficiencies of the prior art.

Specifically, it will be noted that the free ends 35, 35 of the clamping elements 31, 31 are each provided with upper and lower angularly offset surfaces 45,47 on opposite sides of each opening 37 for engaging the fastener clamping surfaces of the bolt head 41 and complementary nut 43 also on opposite sides of the aligned openings 37, 37.

FIG. 6 of the drawings shows, in its diagrammatic illustration, the force represented by arrows F, F applied to lower and upper ends of the bolt head 41 and complementary nut 43. This results in equal load distribution applied through the fastener clamping surfaces of the bolt head 41 and the complementary nut 43 to the upper and lower angularly offset surfaces 45, 47 on each side of an aligned opening 37 in each of the clamping elements 31.

Many important advantages are derived by configuring, shaping and dimensioning the free ends 45, 45 of the clamping elements 31, 31 as described above. As shown in FIG. 6 of the drawings, equal load distribution applied through the bolt head 41 and complementary nut 43 to the free ends 35, 35 of the clamping elements 31, 31 eliminates any bending stresses or bending moments in the clamping bolt 39. Thus, there is little opportunity for distortion or failure of the clamping bolt 39 during and after assembly. The bolt head 41 and/or the complementary nut 43 are also "captured" by the upper and lower angularly offset surfaces 45, 47 at each free end 35, thereby preventing rotation. This eliminates the need for holding either the bolt head 41 or the nut 43 during assembly. It will also be appreciated that the overall appearance of the base clamp 3 is substantially enhanced. As shown in FIGS. 1 and 5 of the drawings, following assembly and clamping of the base clamps 31, 31 to the motor 1, the free ends 35, 35 thereof present a much better appearance, as compared with the prior art construction shown in FIG. 8 of the drawings. Finally, all of the above features can be accomplished with little or no cost, other than tooling cost. However, many other advantages noted above will offset the tooling cost, as will be understood.

From the forgoing, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

We claim:

1. A base clamp for clamping a dynamoeletric machine to a supporting base, comprising a pair of mirror image elongated clamping elements each operably attached at one end to a supporting base and having an inwardly curving configuration for surrounding said machine and for positioning free ends of said elements in proximity to one another, fastener means operably associated with the free ends of said elements for securing and tightening said elements together in the vicinity of the free ends thereof so as to clamp said machine to the supporting base, said fastener means including a headed bolt and complementary nut each having fastener clamping surfaces which extend transverse to a longitudinal axis of the bolt for clamping engagement with fastener engaging surfaces on the free ends of said elements, said fastener engaging surfaces having aligned openings for receiving the bolt therethrough, each of said fastener engaging surfaces further having angularly offset surfaces on opposite sides of each aligned opening, each of said angularly offset surfaces extending at an acute angle to an associated transversely directed fastener clamping surface, and each transversely directed fastener clamping surface engaging both of said angularly offset surfaces on opposite sides of each of the aligned openings, in order to distribute the clamping load from the fastener clamping surfaces to the angular offset surfaces on opposite sides of each aligned opening of the fastener engaging surfaces when the free ends of said elements are secured and tightened together by said headed bolt and complementary nut.

2. The base clamp as defined in claim 1 wherein the angular offset surfaces on opposite sides of each aligned opening cooperate to engage one of said bolt head or complementary nut to prevent rotation thereof during clamping engagement.

3. In a base clamp for clamping a dynamoelectric machine to a supporting base and including a pair of mirror image elongated clamping elements each operably attached at one end to a supporting base and having an inwardly curving configuration for surrounding said machine and for positioning the free ends of said elements in proximity to one another, and fastener means operably associated with the free ends of said elements for securing and tightening the free ends of said elements together so as to clamp said machine to the supporting base, the improvement comprising: said fastener means including a headed bolt and complementary nut each having fastener clamping surfaces which extend transverse to a longitudinal axis of the bolt for clamping engagement with fastener engaging surfaces on the free ends of said elements, said fastener engaging surfaces having aligned openings for receiving the bolt therethrough, each of said fastener engaging surfaces further having angularly offset surfaces on opposite sides of each aligned openings, each of said angularly offset surfaces extending at an acute angle to an associated transversely directed fastener clamping surface, and each transversely directed fastener clamping surface engaging both of said angularly offset surfaces on opposite sides of each of the aligned openings, in order to distribute the clamping load from the fastener clamping surfaces to the angular offset surfaces on opposite sides of each aligned opening of the fastener engaging surfaces when the free ends of said elements are secured and tightened together by said headed bolt and complementary nut.

4. The improvement as defined in claim 3 wherein the angular offset surfaces on opposite sides of each aligned opening cooperate to engage one of said bolt load or complementary nut to prevent rotation thereof during clamping engagement.

* * * * *